UNITED STATES PATENT OFFICE 2,093,115

AROMATIC AMINES WHICH CONTAIN THE TRIFLUOROMETHYL GROUP AND A PROCESS OF PREPARING THEM

Arthur Wolfram and Otto Scherer, Frankfort-on-the-Main, and Emil Hausdörfer, Hofheim-on-the-Taunus, Germany, assignors to General Aniline Works, Inc., New York, N. Y., a corporation of Delaware No Drawing. Application April 22, 1936, Serial No. 75,867. In Germany April 27, 1935

8 Claims. (Cl. 260—130.5)

The present invention relates to aromatic amines which contain the trifluoromethyl group and a process of preparing them.

While the meta-aminotrifluoromethylbenzene and its derivatives are easily obtainable, the ortho- and para-compounds of the same series are produced with difficulty.

We have found that compounds of the following constitution

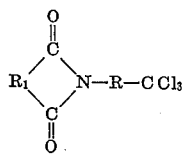

wherein R represents an aromatic radical of the benzene series, and

stands for the radical of phthalic acid, are well adapted for the manufacture of bases which contain the trifluoromethyl-group.

These compounds may be obtained according to U. S. application Serial No. 75,866, filed on the same day herewith in the name of Arthur Wolfram and Emil Hausdörfer, for "Aromatic acid amides containing the trichloro-methyl group and a process of preparing them".

It is easily possible to substitute in compounds of the above formula the three chlorine atoms by fluorine with the aid of hydrofluoric acid. This result is surprising because it could not be supposed, and was not known hitherto, that it would be possible to fluorinate compounds containing carbonyl oxygen by means of hydrofluoric acid.

It is of advantage to perform the reaction in liquid hydrogen fluoride, in the presence or absence of diluents such as, for instance, methylene chloride, at temperatures of about 150° C.

The ortho-dicarboxylic acid is easily split off in known manner by means of alkaline or acid agents preferably with aqueous solutions of feeble alkalies, such as ammonia, sodium carbonate or hydrazine-hydrate.

The bases serve as intermediates for the manufacture of dyestuffs.

By this invention it is possible to obtain a series of new aromatic omega-trifluoromethylamines, for instance, aminophenyl compounds containing one or two $CF_3$-groups in ortho- or meta-positions to the amino group.

The following examples serve to illustrate the invention, but they are not intended to limit it thereto, the parts are by weight:

1.—340 parts of ortho-(omega-trichloro)-methylphenylphthalimide of the formula:

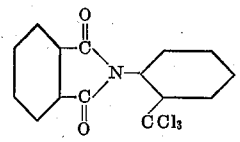

are mixed with 100 parts of hydrogen fluoride in an iron vessel resistant to pressure. The vessel is then heated to about 150° C. whereby the pressure is very rapidly increased. The hydrochloric acid which has been split off is blown off through a valve. As soon as 3 mols of hydrochloric acid have been split off which is the case after about 1-2 hours, the reaction is finished. The cooled product is diluted with methylene-chloride. In order to remove any excess of hydrogen-fluoride the solution is several times shaken with water. After drying with calcium chloride the solvent is driven off. The crude product boils under a pressure of 1 mm. of mercury at 210° C. to 220° C. and distils in the form of a light-yellow resin which becomes crystalline after standing for a prolonged time. By dissolving the resin in hot alcohol, there separate, on cooling, snow-white crystals melting at 129° C. to 131° C. which are free from chlorine but contain 3 fluorine atoms. There is thus obtained the ortho-(omega-trifluoro)-methylphenylphthalimide of the formula:

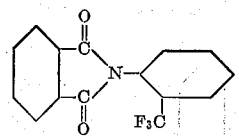

50 parts of ortho-(omega-trifluoro)-methylphenylphthalimide are subjected to steam distillation with 12 parts of hydrazine-hydrate in 250 parts of water. A colorless oil distils over which is somewhat soluble in water. After separation, drying and distillation under a pressure of 2½ mm. of mercury at 68° C. to 70° C. a colorless liquid is obtained which dissolves easily in dilute acids. It is the ortho-(omega-trifluoro)-methylaniline of the formula:

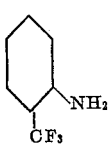

2.—340 parts of ortho-(omega-trichloro)-methylphenylphthalimide are dissolved in methylene chloride. This solution is mixed in an iron pressure vessel with a quantity of hydrogen fluoride which is somewhat larger than the theoretical. The vessel is heated to about 150° C. whereby the pressure is rapidly raised. The hydrochloric acid which has been split off is allowed to escape through a valve as in Example 1. When the reaction is finished the cooled product is shaken with water and dried with calcium chloride. The product is further worked up as described in Example 1.

3.—340 parts of meta-(omega-trichloro)-methylphenylphthalimide of the formula:

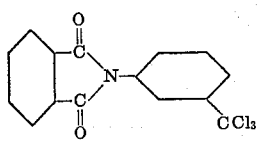

are treated as described in Example 1 with 100 parts of hydrogen fluoride. The crude meta-(omega-trifluoro)-methylphenylphthalimide which is obtained has the same appearance as the ortho-compound described in Example 1. Under a pressure of 6 mm. of mercury it distils at 230° C. to 235° C. The pure meta-(omega-trifluoro)-methylphenylphthalimide is precipitated at once in the form of crystals. It melts at 148° C.

173 parts of meta-(omega-trifluoro)-methylphenylphthalimide are subjected to steam distillation with 38 parts of hydrazine hydrate. The oil thereby obtained as described in Example 1 boils under a pressure of 4.5 mm. of mercury at 70° C. to 85° C., is in the pure state a colorless liquid and dissolves also in dilute acids. It is the meta-(omega-trifluoro)-methyl aniline of the formula:

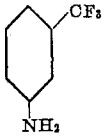

This product is likewise obtained with a good yield.

4.—100 parts of hydrogen fluoride are caused to act in the same manner as described in Example 1 upon 375 parts of 2-(omega-trichloro)-methyl-5-chlorophenylphthalimide of the formula:

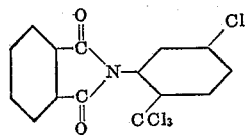

The crystalline grey crude product of 2-(omega-trifluoro)-methyl-5-chlorophenylphthalimide may be obtained in a pure state by boiling it with alcohol. It melts then at 197° C. to 198° C. It forms in the pure state beautiful white crystals.

100 parts of 2-(omega-trifluoro)-methyl-5-chlorophenylphthalimide are heated to boiling for some time with 50 parts of hydrazine hydrate in 1000 parts of water. Thereby an oil splits off which may easily be distilled in steam. After separation and drying of the oil, which may be supposed to be 2-(omega-trifluoro)-methyl-5-chloro-1-aniline of the formula:

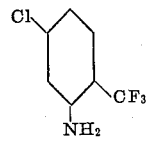

this product distils under a pressure of 14 mm. of mercury at 82° C. to 84° C. as a colorless liquid, which dissolves in dilute acids.

The yields are good.

5.—375 parts of 2-(omega-trichloro)-methyl-3-chlorphenylpthalimide of the formula:

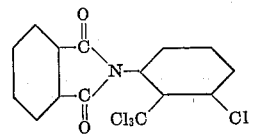

are mixed with 100 parts of hydrogen fluoride. The conditions of reaction and further treatment of the product obtained are the same as those stated in Example 1. By distillation of the crude product under reduced pressure the 2-(omega-trifluoro)-methyl-3-chlorphenylphthalimide is obtained which boils at 195° C. to 200° C. under a pressure of 1 mm. of mercury.

50 parts of the 2-(omega-trifluoro)-methyl-3-chlorphenylphthalimide together with 25 parts of hydrazine-hydrate are subjected to steam distillation. An oil distils over which, after separation and drying, boils at 55° C. to 60° C. under a pressure of 0.5 mm. of mercury. It is the 2-(omega-trifluoro)-methyl-3-chloraniline of the formula:

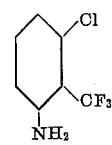

The yields are good.

6.—100 parts of hydrogen fluoride are caused to act, as stated in Example 1, upon 375 parts of 2-(omega-trichloro)-methyl-4-chlorphenylphthalimide of the formula:

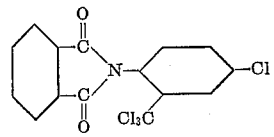

The crude product obtained is distilled under reduced pressure. The 2-(omega-trifluoro)-methyl-4-chlorphenylphthalimide, boiling at 197° C. to 203° C. under a pressure of 1.3 mm. of mercury and melting at 143° C. to 145° C. is thus obtained. 375 parts of 2-(omega-trifluoro)-methyl-4-chlorphenylphthalimide together with 150 parts of hydrazine-hydrate are subjected to steam-distillation. The oil which distils over together with the water is separated in the usual manner and dried. It boils under a pressure of 3 mm. of mercury at 66° C. to 67° C.; it is the 2-(omega-tri-fluoro)-methyl-4-chloraniline of the formula:

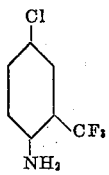

This product is obtained with a good yield.

7.—375 parts of 2-(omega-trichloro)-methyl-6-chlorphenylphthalimide of the formula:

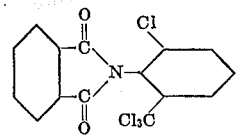

are caused to act, as stated in Example 1, upon 100 parts of hydrogen fluoride. By distillation under reduced pressure the pure 2-(omega-tri-fluoro)-methyl-6-chlorphenylphthalimide is obtained which boils under a pressure of 0.2 mm. of mercury at 180° C. to 185° C.

200 parts of 2-(omega-trifluoro)-methyl-6-chlorphenylphthalimide are heated to 100° C. with 100 parts of hydrazine hydrate in 1000 parts of water. The oil formed is blown off by means of steam, separated from the water and dried. The 2-(omega-trifluoro)-methyl-6-chloraniline of the formula:

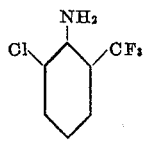

is obtained with a good yield; it boils at 39° C. to 40° C. under a pressure of 0.1 mm. of mecury. Its acetyl compound melts at 165° C. to 166° C.

8.—375 parts of 3-chloro-4-(omega-trichloro)-methyl-phenylphthalimide of the formula:

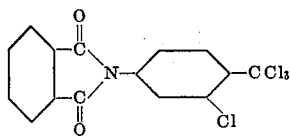

are caused to act upon 100 parts of hydrogen fluoride as stated in Example 1. The crude product is re-crystallized from benzene. The pure 3-chloro-4-(omega-trifluoro)-methyl-phenyl-phthalimide thus obtained melts at 200° C. to 202° C. The yield is good.

100 parts of 3-chloro-4-(omega-trifluoro)-methyl-phenylphthalimide are heated to boiling with 50 parts of hydrazine hydrate in 1000 parts of water. By subsequent steam distillation water and an oil pass over; the oil burns under a pressure of 10 mm. of mercury at 112° C. to 115° C. It is the 3-chloro-4-(omega-trifluoro)-methyl-aniline of the formula:

Its acetyl compound melts at 104° C. to 106° C.

9.—As stated in Example 1, 100 parts of hydrogen fluoride are caused to act upon 409 parts of 4-(omega-trichloro)-methyl-2,5-dichlorophenyl-phthalimide of the formula:

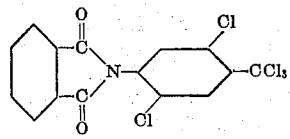

The crude product is recrystallized from benzene. It melts then at 182° C. to 183° C. The yield of pure 4-(omega-trifluoro)-methyl-2,5-dichlor-phenylphthalimide thus obtained is good.

When 216 parts of this product and 100 parts of hydrazine-hydrate are subjected to steam distillation a solid colorless product distils over together with the water; when distilled under a reduced pressure, it boils at 95° C. to 100° C. under a pressure of 0.8 mm. of mercury. It melts at about 50° C. It is the 4-(omega-tri-fluoro)-methyl-2,5-dichloraniline of the formula:

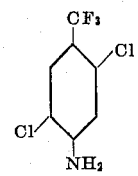

The acetyl compound which may easily be prepared melts at 157° C. to 158° C. The yields are good.

10.—By treating as stated in Example 1 458 parts of 2,4-di-(omega-trichloro)-methylphenyl-phthalimide of the formula:

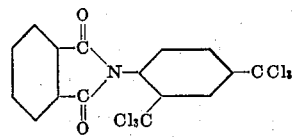

with 100 parts of hydrogen fluoride and subsequent distillation under reduced pressure the 2,4-di-(omega-trifluoro)-methylphenylphthalimide is obtained with a good yield; it boils at 185° C. to 190° C. under a pressure of 2 mm. of mercury.

150 parts of 2,4-(omega-trifluoro)-methylphe-nylphthalimide are subjected to steam distillation with 75 parts of hydrazine hydrate in 1000 parts of water. The oil which distils over boils, after its separation from the water and drying, under a pressure of 0.4 mm. of mercury, at 50° C. It is the 2,4-di-(omega-trifluoro)-methylaniline of the formula:

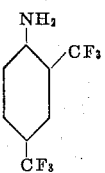

The yield is good.

11.—285 parts of hydrofluoric acid are caused to act, as stated in Example 1, upon 325 parts of 2,6-di-(omega-trichloro)-methylphenylhpthal-imide of the formula:

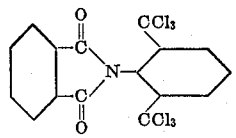

The crude product obtained is further treated as described above and is then very pure and may well be used for the saponification. The pure 2,6 - di - (omega - trifluoro) -methylphenylphthalimide boils at 160° C. to 163° C. under a pressure of 0.2 mm. of mercury.

150 parts of 2,6-di-(omega-trifluoro)-methylphenylphthalimide and 75 parts of hydrazine hydrate in 1000 parts of water are subjected to steam distillation. The oil which distils over is separated from the water and dried. The 2,6-di-(omega-trifluoro)-methyl-aniline of the formula:

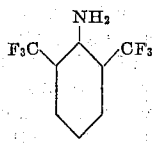

is thus obtained in the form of an oil which boils at 37° C. under a pressure of 0.2 mm. of mercury. The yields are satisfactory.

We claim:

1. The process which comprises causing hydrogen fluoride to act at a temperature of about 150° C. upon a compound of the general formula:

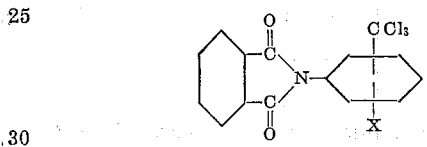

wherein X means a member of the group consisting of hydrogen, chlorine and the group —CCl₃ and splitting off according to known methods the phthalic acid radical from the fluorinated product.

2. The process which comprises heating at about 150° C. the compound of the formula:

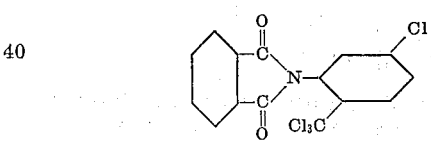

with hydrogen fluoride in a closed iron pressure vessel, allowing the hydrogen chloride formed to escape and splitting off according to known methods the phthalic acid radical from the fluorinated product.

3. The process which comprises heating at about 150° C. the compound of the formula:

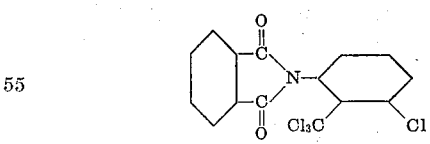

with hydrogen fluoride in a closed iron pressure vessel, allowing the hydrogen chloride formed to escape and splitting off according to known methods the phthalic acid radical from the fluorinated product.

4. The process which comprises heating at about 150° C. the compound of the formula:

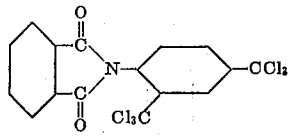

with hydrogen fluoride in a closed iron pressure vessel, allowing the hydrogen chloride formed to escape and splitting off according to known methods the phthalic acid radical from the fluorinated product.

5. The compound of the formula:

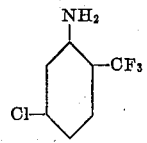

boiling under a pressure of 14 mm. of mercury at 82° C. to 84° C. as a colorless liquid which dissolves in dilute acids.

6. The compound of the formula:

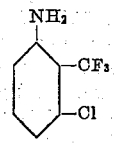

boiling at 55° C. to 60° C. under a pressure of 0.5 mm. of mercury.

7. The compound of the formula:

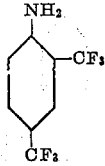

boiling at 50° C. under a pressure of 0.4 mm. of mercury.

8. The compounds of the general formula:

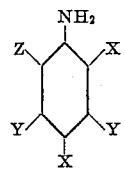

wherein one X represents the trifluoromethyl radical and the other X represents a member of the group consisting of hydrogen and the trifluoromethyl radical, Y represents a member of the group consisting of hydrogen and chlorine and Z represents a member of the group consisting of hydrogen, chlorine and the trifluoromethyl radical.

ARTHUR WOLFRAM.
OTTO SCHERER.
EMIL HAUSDÖRFER.